United States Patent [19]

Albanese

[11] 4,216,472

[45] Aug. 5, 1980

[54] GATED PSEUDONOISE SEMI-ACTIVE MISSILE GUIDANCE SYSTEM WITH IMPROVED ILLUMINATOR LEAKAGE REJECTION

[75] Inventor: Damian F. Albanese, Chatsworth, Calif.

[73] Assignee: International Telephone and Telegraph Corporation, New York, N.Y.

[21] Appl. No.: 392,985

[22] Filed: Aug. 30, 1973

[51] Int. Cl.³ .................. G01S 13/00; F41G 7/00
[52] U.S. Cl. .................. 343/7.3; 244/3.14; 244/3.19; 343/7 ED; 343/7 A
[58] Field of Search .......... 343/7 A, 7 ED, 7.3, 343/12 R, 6.5 LC; 244/3.14, 3.19

[56] References Cited

U.S. PATENT DOCUMENTS

| | | | |
|---|---|---|---|
| 3,631,485 | 12/1971 | Beazell, Jr. | 343/7 A |
| 3,641,573 | 2/1972 | Albanese | 343/12 R |
| 3,680,090 | 7/1972 | Bishop | 343/6.5 LC |
| 3,698,811 | 10/1972 | Weil | 343/7 ED |
| 3,725,935 | 4/1973 | Alpers | 343/7 A |
| 3,729,150 | 4/1973 | Conger | 343/7 A |
| 3,733,604 | 5/1973 | Smith | 343/7 A |

Primary Examiner—S. C. Buczinski
Attorney, Agent, or Firm—William T. O'Neil

[57] ABSTRACT

A system for elimination of transmitter (illuminator) leakage in a high duty cycle, pulsed, pseudonoise, semi-active missile guidance system. The missile has front and back receiving systems, and the illuminator signal extant at the rear receiver is used to develop a gating signal which turns the front receiver "off" during the time of arrival of the leakage signals at the front receiver. The receiver gating is automatically time adjusted as a function of missile range. Alternate reversal of the bi-phase transmitted code bits is offered as a means of reducing the "eclipsing" loss due to receiver gating out of useful signal return from the target being tracked.

8 Claims, 9 Drawing Figures

U.S. Patent  Aug. 5, 1980  Sheet 1 of 3  4,216,472
FIG.1.
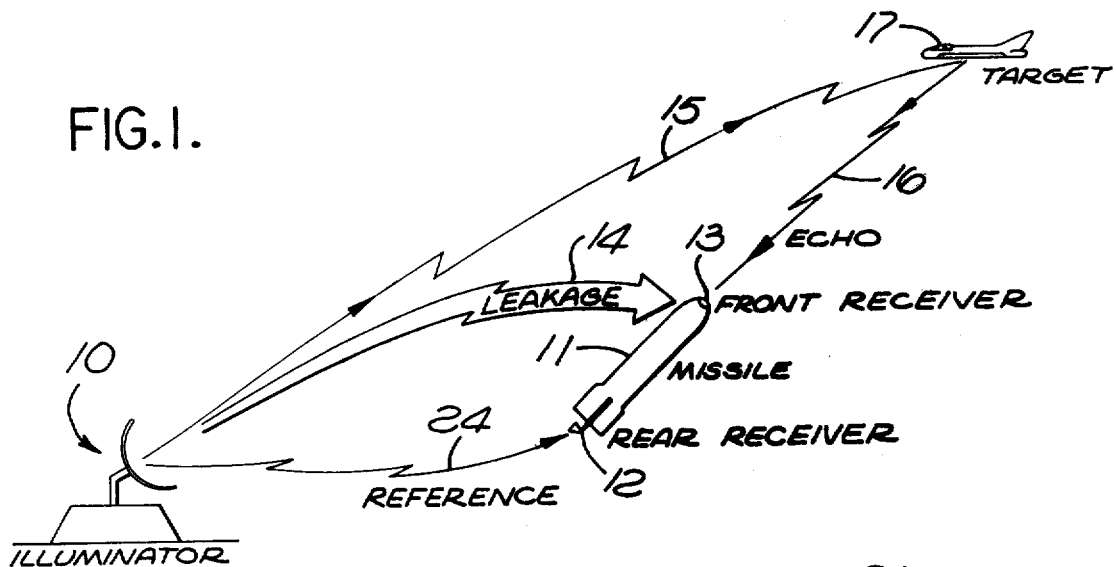
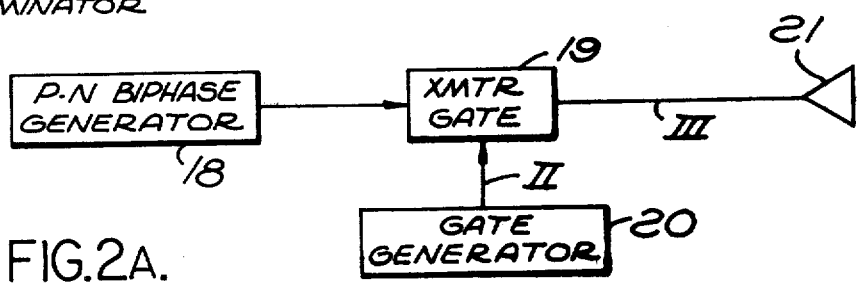
FIG.2A.
P-N BI-PHASE MODULATED SIGNAL I
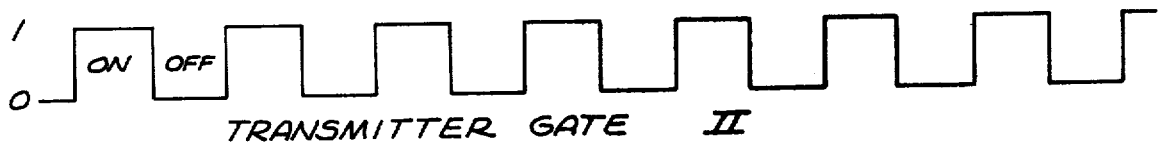
TRANSMITTER GATE II
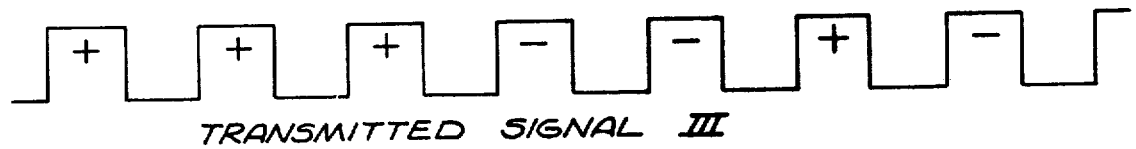
TRANSMITTED SIGNAL III
FIG.2B.

GATED PSEUDONOISE SEMI-ACTIVE MISSILE GUIDANCE SYSTEM WITH IMPROVED ILLUMINATOR LEAKAGE REJECTION

BACKGROUND OF THE INVENTION

1. Field of the Invention

The present invention relates generally to the field of electronic (radar) missile guidance. More particularly, the present invention relates to a semi-active, high duty cycle, pulsed, pseudonoise system for missile guidance.

2. Description of the Prior Art

One of the major problems associated with the operation of a semiactive continuous wave guidance system is the illuminator leakage which competes with the target return echo in the missile receiving system. The said leakage signal level may be 100 decibels or more above the desired echo power level, and is of variable strength as a function of the relative ranges between missile and the ground illuminator on the one hand, and the missile and the target on the other hand. The actual power ratio between this undesired leakage and the illuminated target re-radiation which is to be detected also depends on whether or not the missile is in the illuminator antenna main beam or one of its side lobes. The large leakage signal can and does cause saturation in the receiver which can have the affect of "blinding" the missile.

Of course, the echo from the target, as received at the missile front receiver, will exhibit a doppler frequency shift in excess of that received by the missile as leakage from the ground illuminator. This is due to the fact that the leakage doppler results only from the missile's own velocity, whereas the front receiver signal exhibits a doppler shift as a function of the closing velocity between the missile and target. That fact can be, and has been, used to separate the two signals; however, leakage noise sidebands can readily fall into the system echo doppler band with the result that missile performance tends to deteriorate no matter how sharp the frequency discriminating circuits might be.

It has been demonstrated that the affect of the aforementioned leakage can be reduced by utilizing pseudonoise (PN) modulation on the CW carrier. That technique is described in U.S. Pat. No. 3,641,573. However, due to other system constraints, such as lock on time, when using that type of modulation, the realized improvement (on the order of 20 or 30 decibels) may not always be sufficient.

It should be noted that the reason for utilizing pseudonoise modulation in a CW semi-active system of the type to which the present invention relates is not primarily leakage reduction. Rather, the pseudonoise modulation technique in such CW semi-active systems has been recognized as a vehicle for improving performance in certain electronic environments. Such improvements are due to the autocorrelation function of the PN modulation which affords the system range, as well as doppler, discrimination.

Accordingly, it will be recognized as highly desirable to retain the PN modulation while totally eliminating the aforementioned leakage at least insofar as its affect on the system is concerned.

SUMMARY OF THE INVENTION

In accordance with the aforementioned state of the prior art and its disadvantages, it may be said to be the general object of the present invention to produce a semi-active pseudonoise missile guidance system which is substantially immune to the affect of the relatively high powered leakage signal hereinbefore described.

It is well known that a narrow pulse radar system, i.e. a radar system having a relatively low duty cycle, does not suffer the affects of transmitter leakage. However, such low duty cycle pulse systems with their short transmitted pulse duration as a fraction of the total interpulse period, do not retain the advantages of a CW system. Those inherent CW advantages include high average power on target for a given peak power, absence of doppler ambiguities, and the capability for or adaptability to PN-type modulation.

In order to substantially retain the inherent advantages of a CW system, the present invention utilizes a high duty cycle transmitter pulse arrangement. A typical high duty cycle for the system would be 50 percent, and that value will be used as a basis of the more detailed description of the invention hereinafter following.

A pseudonoise code is normally generated as a bi-phase modulated signal with only negligible time between phase changes. The present invention contemplates transmission during only one-half of the normal bit length of such a bi-phase modulated signal. The general approach used is to gate off the receiver during the time of arrival of the transmitter leakage signal. Although this approach is fairly straightforward in a monostatic radar wherein the receiver and transmitter are co-located, the semi-active system to which the present invention applies requires that the receiver gating be continuously changed due to the fact that the missile is moving with respect to the illuminator. The present invention accomplishes this through a new use of the rear reference receiver of the missile, which already exists as a normal part of a semi-active missile guidance system.

The approach then is to detect the transmitted signal in the rear receiver and utilize the resulting pulse train to gate off the front receiver on a bit-to-bit basis during the time that the leakage will be present at the front receiver. The said leakage signal will normally be delayed with respect to the signal arriving at the rear reference receiver by an amount which can theoretically vary from zero (missile flanked) to the time it takes for the radiated pulse to travel a distance equal to the missile length (missile axially aligned on the line of site for the illuminator). The manner in which the present invention is implemented will be more throoughly understood as this description proceeds.

BRIEF DESCRIPTION OF THE DRAWINGS

FIG. 1 depicts a semi-active missile guidance system of the type to which the present invention applies.

FIG. 2(a) presents a block diagram of the known gated PN bi-phase modulating arrangement.

FIG. 2(b) illustrates waveforms applicable to FIG. 2(a) when operated in accordance with the requirements of the present invention.

DESCRIPTION OF THE PREFERRED EMBODIMENT

Figure 3A:
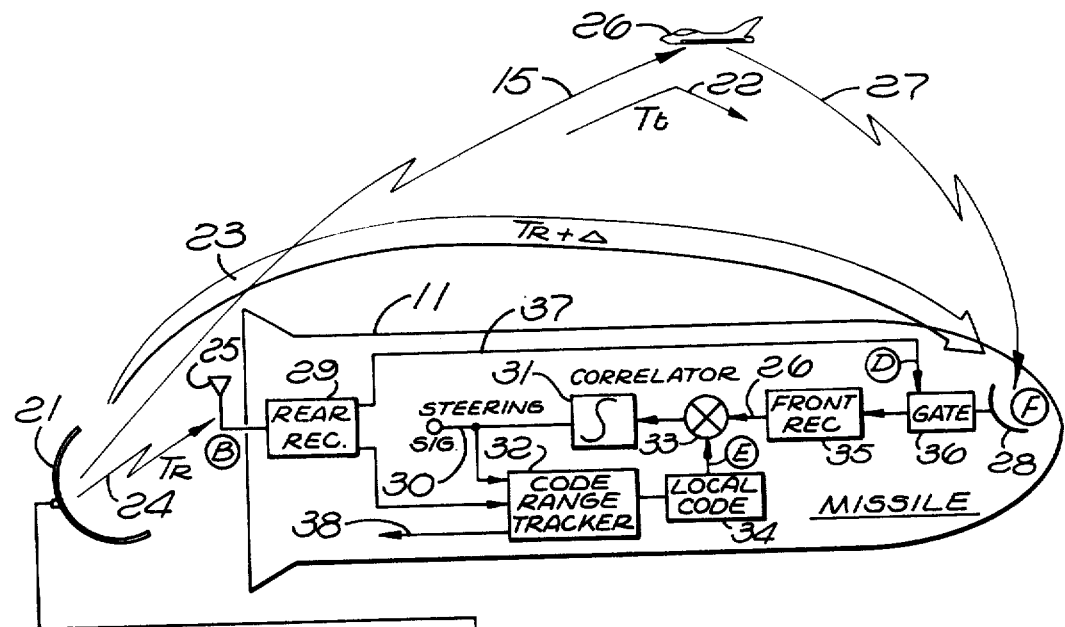
FIG. 3(a) illustrates, in block diagram form, a gated pseudonoise semiactive missile system in accordance with the present invention including ground and missile borne elements of the system.

Referring now to FIG. 1, a typical semi-active missile guidance system is depicted. It is this type of system to which the present invention is particularly adapted. A ground radar or illuminator 10 is aimed by means of a tracking arrangement (not a part of this invention) to illuminate the target 17 along a general path 15. The target reflects some of this energy along a path 16 to the front receiver 13 of the guided missile 11. A rear receiver 12 also receives energy from the illuminator. If the illuminator is programmed in accordance with the present invention, i.e. if it operates on the described 50 percent duty cycle transmitting a bi-phase modulated code or fraction thereof during its "on" time, the pseudonoise code is thereby introduced into the missile airborne system for use in correlating against the target reflected energy along the path 16, as received by the missile front receiver 13. The energy to 13 by path 14 is commonly referred to as leakage.

Referring now to FIG. 2(i a), an arrangement for transmitting the aforementioned PN bi-phase code is seen. Considering also FIG. 2(b), the pseudonoise bi-phase modulated signal from generator 18 is depicted at FIG. 2(b) I. A gate generator 20 operated synchronously with generator 18 provides a transmitter gate II during the first half of each pseudonoise digit in the waveform I. Accordingingly, the transmitter gate 19 passes the RF from generator 18 which has been time-gated in accordance with II to produce a transmitted signal III to the antenna 21. It could be said that the bi-phase modulated signal I is sampled repetitively on a 50 percent duty cycle basis to produce the waveform III which is the envelope transmitted by the illuminator antenna 21. The plus and minus signs in waveforms I and III correspond, these representing the two discrete phases in the bi-phase modulated signal format.

Referring now to FIG. 3(a), a block diagram of a gated pseudonoise semi-active missile system in accordance with the present invention is depicted. The components 18, 19, 20 and 21, as before in connection with FIGS. 2(a) and 2(b), represent the illuminator or ground components. The said ground originated illumination travels along a path 24 to the missile near receiving antenna 25 and as leakage along a path 23 arriving at the missile front receiving antenna 28. It will be noted that the signal along the said path 24 arrives at the rear antenna 25 with a delay $T_R$ and at the missile front receiving antenna 28 at a relative time $T_R + \Delta$. Those antennas 25 and 28 along with the components illustrated within the outline of the missile 11 constitute the missile borne portion of the electronic system in accordance with the present invention.

Figure 3B:
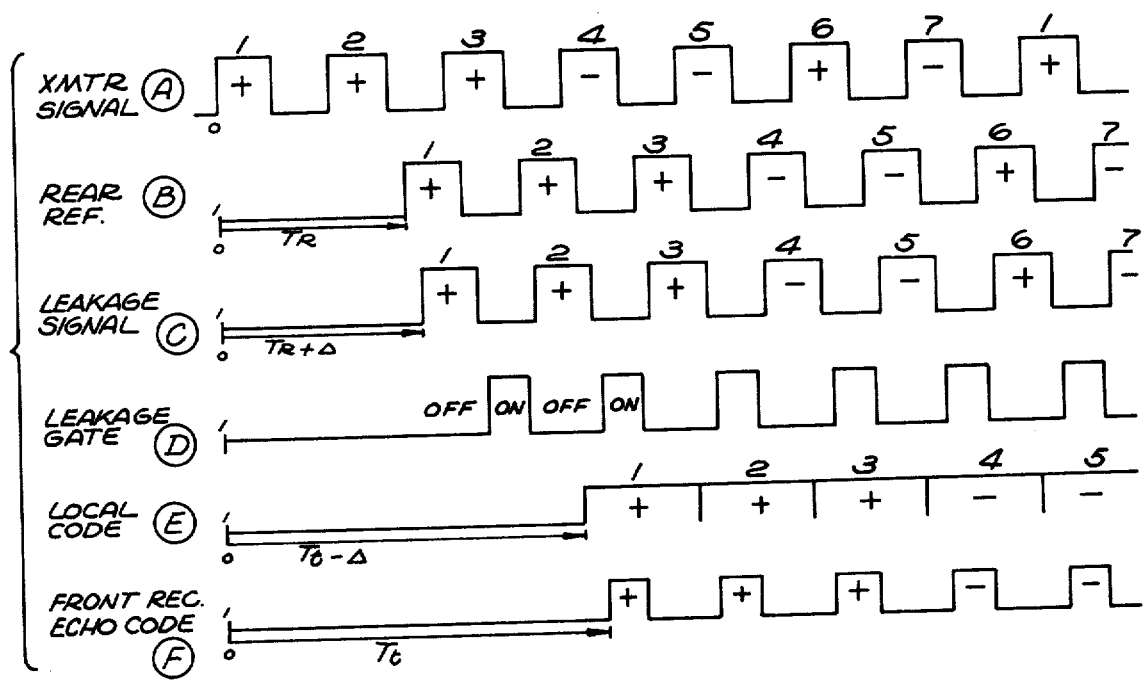
FIG. 3(b) presents waveforms as extant in the arrangement of FIG. 3(a) and as related to various points in the circuit.

Considering FIG. 3(b) along with FIG. 3(a), it will be noted that the transmitted signal from the ground illuminator is identified as A on FIG. 3(b). This is the same waveform in substance as referred to at FIG. 2(b) III. Thus, it is a waveform received with differential delay $\Delta$ at the missile front and back antennas, as aforesaid. FIG. 3(b) waveform F illustrates a typical reflected signal from target 26 whereby the waveform A arrives at the missile front antenna 28 with delay $T_t$ having traversed the path represented by the arrow 22. As previously indicated, the leakage along path 23 arrives at the missile front antenna 28 as waveform C of FIG. 3(b), that is, in acordance with an additional delay amount $\Delta$. This leakage signal (waveform C) is passed from receiving antenna 28 to a gate 36 in which it can be passed or interrupted in accordance with a control gate on lead 37 (waveform D), and thence to front receiver 35.

It will be noted that waveform B is passed from rear antenna 25 into the rear receiver 29 to a code range tracker 32 and then into a digital register or similar device 34 for retaining a demodulated pseudonoise code (E), hereinafter referred to as the local code.

The code range tracker 32 is essentially a range tracker in the well-known sense. Its function is to delay a local code as derived through the rear receiver 29 in active circuitry to match the code received via 28 through gate 36 and front receiver 35 via reflected path 27, and present as waveform F at 26. The amount of delay is controlled from the correlator which comprises the multiplier circuit 33 and integrator 31. The output of integrator 31 is an analog signal capable of controlling the said local code variable delay in unit 32.

Actually, the signal 30 identified in FIG. 3(a) as a steering signal contains an amplitude modulation from conical scanning of the antenna 28 in a practical system using the present invention; and therefore unit 32 would be designed to be insensitive to this amplitude modulation and only respond to the average value of the signal at 30 for range tracking purposes. Some further discussion of the steering signal at 30 will be undertaken later in this description.

Upon inspection, it will be realized that the code range tracker 32, the local code register 34, the multiplier 33 and integrator 31 comprise a tracking loop. The unit 32 would ordinarily also include search and lock-on functions, as are well understood in this art. Actually, the details of the range tracking function are not necessary in the description of the present invention, however, the reader desiring more information on this aspect of the present invention is referred to the technical literature. The textbook "Modern Radar" by Raymond S. Berkowitz (John Wiley and Sons, Inc., 1965)—Library of Congress Catalog Card No. 65-21446, is a useful reference in respect to the nature of tracking radars (Chapter 7) and also for background on pseudo-random binary coded waveforms (Chapter 4). The tracking radar information contained in that reference is useful in respect to an understanding of the aforementioned range tracking function and also of the conical scanning function of the missile front antenna 28. Another significant reference in respect to pseudorandom sequences and their implementation is the textbook "Radar Handbook" by Merrill Skolnik (McGraw-Hill, 1970)—Library of Congress Catalog Card No. 69-13615 (see Section 20.5 entitled "Phase-Coded Waveforms" and also Chaper 21 entitled "Tracking Radar in Respect to Range Tracking and Conical Scanning").

Referring again to FIG. 3(a), and also to FIG. 3(b) in conjunction therewith, it will be noted that the so-called leakage gate (waveform D) present on lead 37 is developed in the rear receiver 29 beginning the "on" part of its cycle at the end of the leakage signal waveform C. This is accomplished by insuring that the rear receiver 29 provides enough signal delay to compensate for the value of $\Delta$ as depicted. In that way, the front receiver gating device or electronic switch 36 will be gated on only when no leakage signal is present. The duration of the "on" portion of the leakage gate (waveform D) is also predetermined within rear receiver 29 so that it reverts to the "off" position before the next code bit of the leakage signal. Thus, the waveform E, which is the local code from unit 34, begins only after $T_t$ (the range tracking circuit delay) reduced only by $\Delta$, because of this small differential delay $\Delta$ in the rear receiver 29. The received or desired front receiver echo code waveform F is, of course, present at a delay based on the range-to-target, and this delay is also represented by $T_t$ since this is the delay to which the range tracking or code range tracker 32 operates.

Accordingly, it will be understood that the multiplier 33 and integrator 31 provide the correlation function.

Figure 4A:
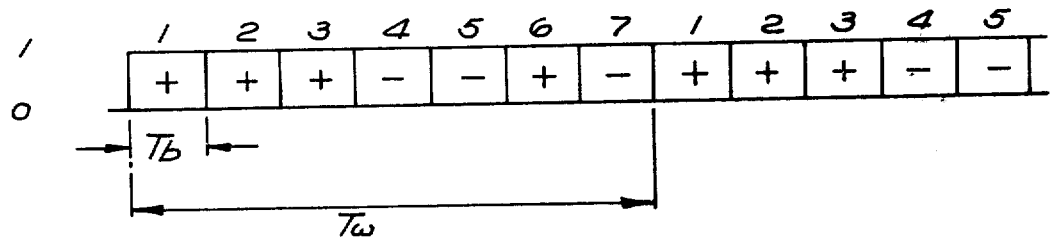
FIGS. 4(a) and 4(b) illustrate a representative PN code and correlation function therefor, respectively.
Figure 4B:
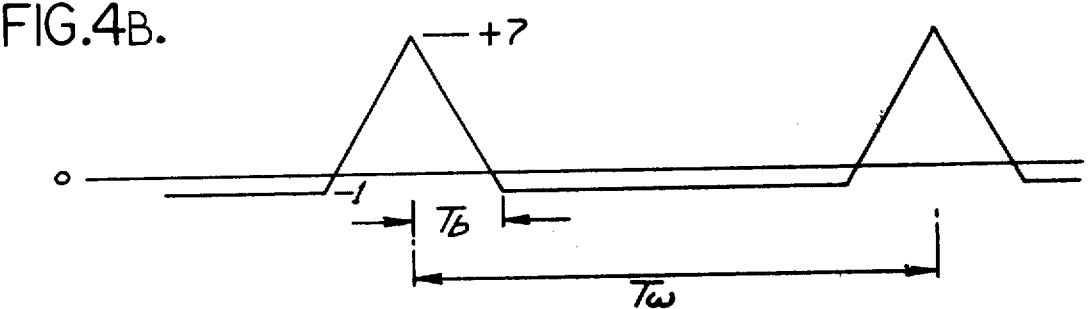

In FIGS. 4(a) and 4(b), a self-explanatory pair of diagrams illustrate a typical pseudonoise code and correlation function therefor, respectively. It would, therefore, be noted that $T_w$ is the word length, $T_b$ the bit duration, and +7 the peak correlation function amplitude corresponding to "perfect" reference or local code matching against a received code. It will be noted that the correlation function has positive values over a time approaching $2T_b$.

Figure 4C:
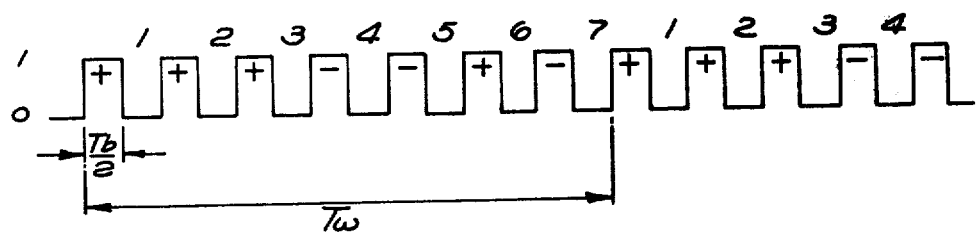
FIGS. 4(c) and 4(d) illustrate a gated PN code and correlation function therefor, respectively.
Figure 4D:
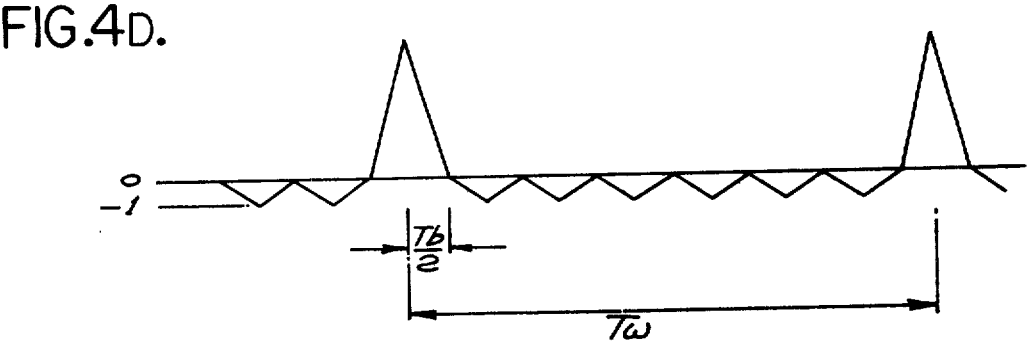

FIGS. 4(c) and 4(d) illustrate the same situation specialized to the situation of the present invention in which the bi-phase transmitted code has a 50 present duty cycle as illustrated in FIG. 4(c). The relationships are essentially self-explanatory, the most significant difference in the correlation function FIG. 4(d) being the compression to a value on the order of $T_b$ which is half the time illustrated in FIG. 4(b). The significance of this fact is that range resolution is improved.

The range tracking loop hereinabove referred to operates in a manner very similar to the well-known pulse radar range tracking circuit except that it monitors the correlation function; that is, the output of the correlator comprising 33 and 31 to adjust the local code delay into synchronism with the reflected code from 28, 36 and 35. In the search mode, in such a circuit, correlation is detected, for lock-on purposes, as the local and received codes "slip by" each other. An output 38 from the code range tracker 32 is illustrated within the missile 22, and it is this signal and the steering signal 30 which are otherwise utilized within the missile for guidance purposes in homing on the target 26. The actual missile control circuits are, of course, not a part of the invention, but they are known per se.

As previously indicated, it is common for the front antenna 28 in such a missile system to scan conically. In the textbook references given, the nature and instrumentation of conical scanning are explained. Suffice to say, for present purposes, the steering signal 30 will contain an amplitude modulation as a result of this conical scanning. The missile system would normally be capable of employing this signal to modify pitch and yaw missile attitudes so that the missile effectively homes on the target 26.

Since the receiver is gated off in 36 approximately 50 percent of the time, the returning echo can be eclipsed in the front receiver. Assuming a point source target, the returning echo could arrive at the instant the leakage gate is closed, causing partial or total loss of the echo signal. If the spatial extent of the target is at least equal to the transmitted pulse length (i.e. ½ code bit length), then the echo received at the front receiver will be extended in time so that the signal will always be available at the antenna for gating into the front receiver. Of course the portion of the return not gated into the receiver constitutes a power loss situation.

In the case of the point source or nearly point source target, a method of assuring against total loss of signal may be required. Such an objective can be served by reversing the on and off periods of each consecutive code word, i.e. as transmitted by the transmitter gate 19. A 180 degree phase reversal of the waveform generated by the transmitter gate generator 20 alternately from one code word to the next insures that the echo arriving at the front antenna cannot be totally lost although an average of 3 decibels of the point source reflected power is thereby lost.

The nominal power loss experienced as a result of natural eclipsing and anti-eclipsing measures is relatively small considered vis-a-vis the very great advantage of substantially complete freedom from the masking effect of the very high powered leakage signals described.

A system in accordance with the present invention will exhibit all the advantages of CW pseudonoise systems in terms of multiple target, jamming and clutter performance. The autocorrelation function is only slightly different from that provided by the well-known CW pseudonoise code arrangement.

Modifications and variations are, of course, possible once the nature of the present invention is understood. Accordingly, it is not intended that the drawings or this description should be regarded as a limitation on the scope of the present invention.

What is claimed is:

1. In a semi-active pseudonoise missile guidance system having a ground illuminator orientable to cause reflections of electromagnetic energy from a selected target, the combination comprising:
   first means within said ground illuminator for generating a repetitive pseudonoise code word having a predetermined bit duration;
   second means for repetitively selecting and transmitting a corresponding fraction of each bit of said code word to produce a gate pseudonoise transmitted sequence having a predetermined fractional duty cycle;
   front and rear receiving means within said missile, said rear receiving means being responsive to said transmitted sequence for establishing a local code and said front receiving means being responsive to said reflections, said front receiving means also being subject to undesired leakage signals of relatively high intensity from said ground illuminator;
   third means operating from the received signal output of said rear receiving means for producing a leakage gating signal having "on" and "off" times and for applying said gating signal to correspondingly gate the input of said front receiver "on" and "off", said third means being arranged to delay the beginning of said "on" time by a time increment at least equal to the radiation transit time of said transmitted second means output from said rear receiver to said front receiver as said leakage signals.

2. Apparatus according to claim 1 including a range tracking loop responsive to said front and rear receiving means for generating said local code in time coincidence with the code contained in said reflections thereby to track said reflection signals.

3. Apparatus according to claim 1 in which said predetermined fractional duty cycle is substantially fifty percent.

4. Apparatus according to claim 2 in which said predetermined fractional duty cycle is substantially fifty percent.

5. Apparatus according to claim 2 in which said third means is further defined as being responsive to the trailing edge of each cycle of said transmitted sequence as received at said rear receiving means for terminating the "on" time of said leakage gating signal.

6. Apparatus according to claim 2 in which said first means is arranged to reverse the positive and negative bit pattern of said code word for each successive repetition of said code word.

7. Apparatus according to claim 5 in which said predetermined fractional duty cycle is substantially fifty percent.

8. Apparatus according to claim 6 in which said predetermined fractional duty cycle is substantially fifty percent.

* * * * *